Patented Jan. 6, 1942

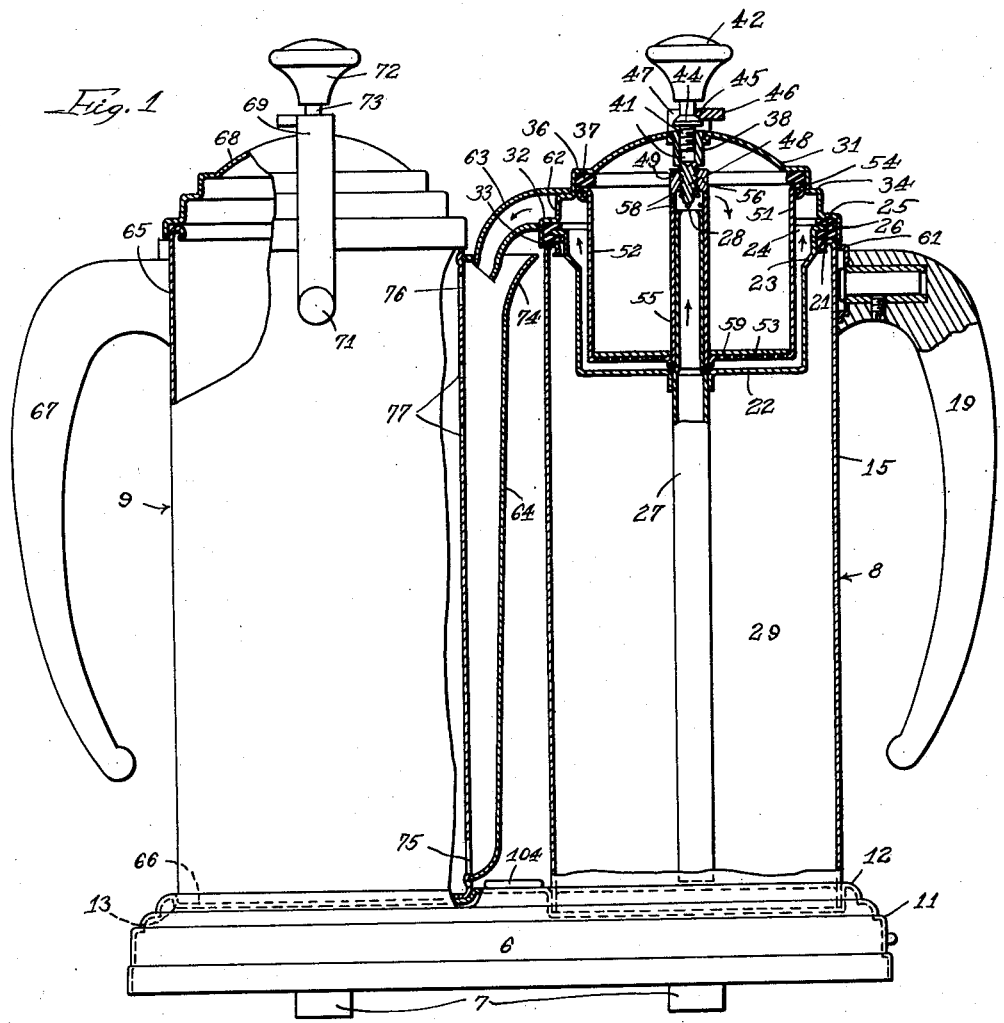
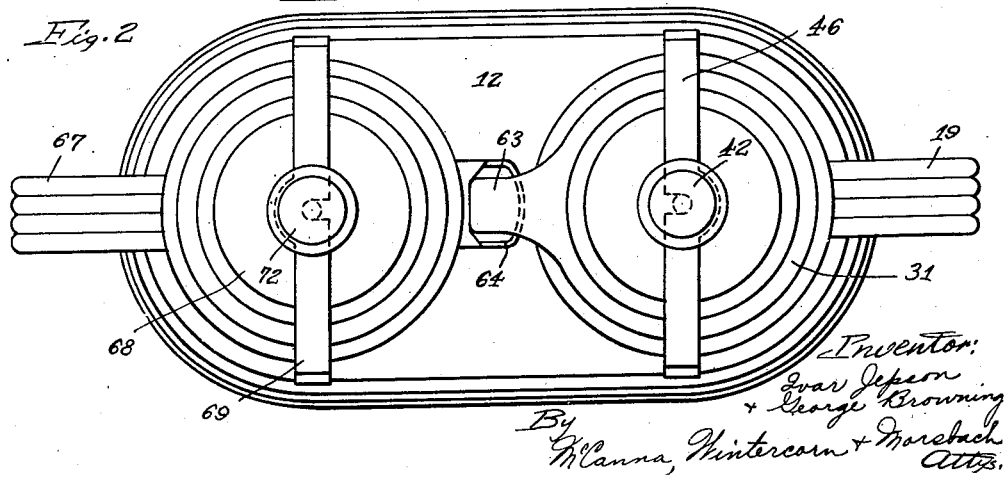

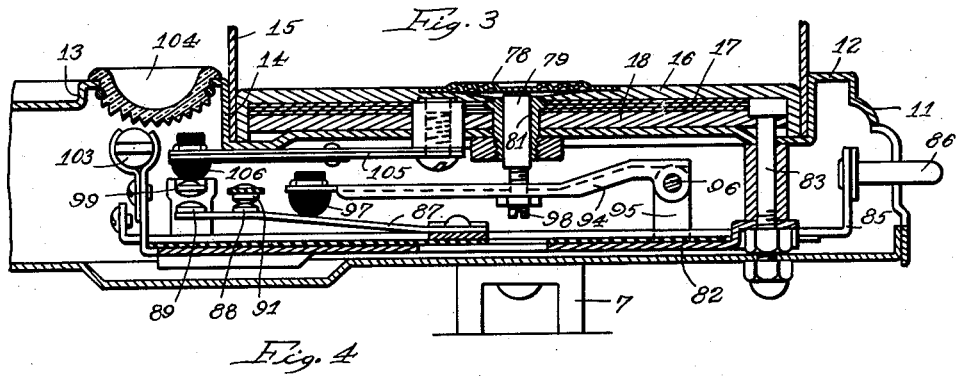
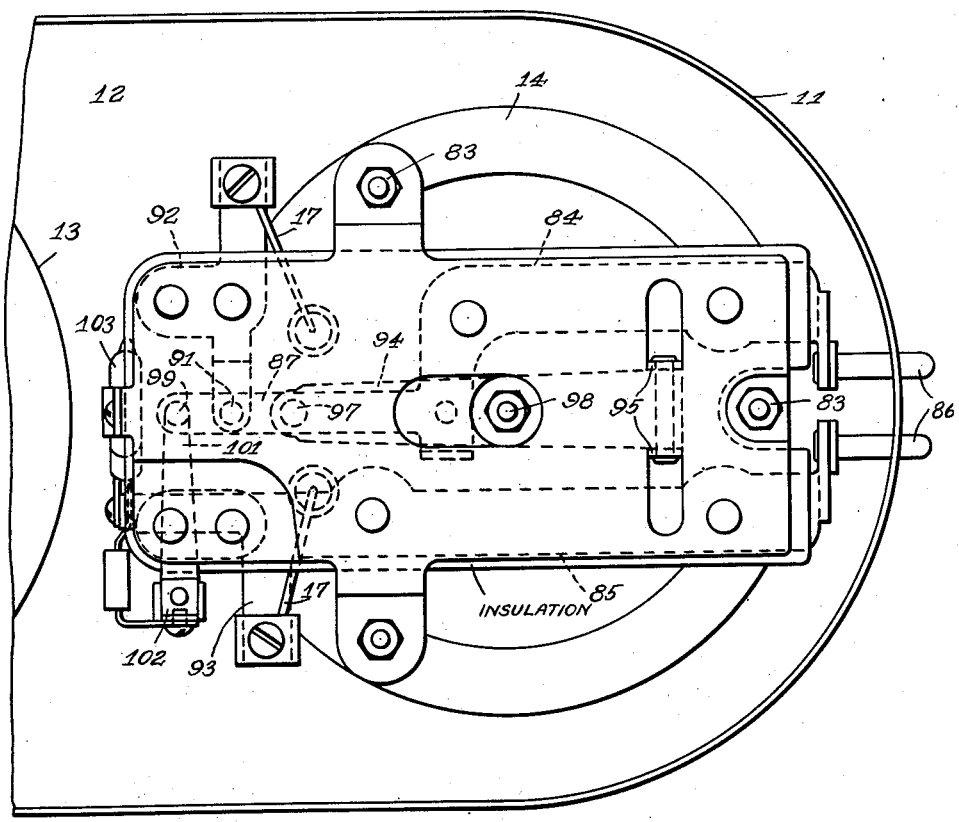
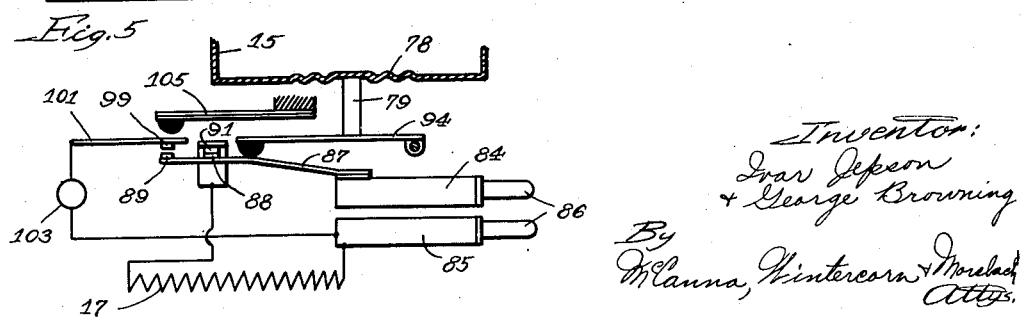

2,269,112

UNITED STATES PATENT OFFICE 2,269,112

COFFEE MAKER

Ivar Jepson and George Browning, Chicago, Ill., assignors to Chicago Flexible Shaft Company, Chicago, Ill., a corporation of Illinois Original application March 5, 1937, Serial No. 129,163. Divided and this application June 30, 1939, Serial No. 282,014

19 Claims. (Cl. 53—3)

This invention relates to cooking devices, and in many aspects deals more particularly with electric coffee makers.

An important object of the invention is the provision of a coffee maker of generally improved form having a novel arrangement of parts operative in the making and serving of coffee.

Another object of the invention is the provision of a coffee maker having coffee making and coffee storing or serving elements and heating means for these elements adapted to maintain a predetermined temperature for making coffee and a different predetermined temperature for storing the coffee.

A still further object of the invention is the provision of a coffee maker of the type wherein the coffee liquor is formed by the passage of water through a bed of coffee wherein means are provided for passing the water through the bed at substantially a predetermined and uniform rate of flow and under a predetermined pressure, together with pressure controlled means for regulating the extraction temperature.

We have also aimed to provide a coffee maker of the type having a making pot and a serving pot, wherein novel means are employed for transferring the coffee liquor from the making to the serving pot.

We have further aimed to provide an extraction unit of improved characteristics.

Other objects and advantages will appear during the course of the following description and from the accompanying drawings, in which—

Figure 1 is a side view of a coffee maker embodying our invention, some of the parts thereof being shown in section;

Fig. 2 is a top view of the device shown in Figure 1;

Fig. 3 is a fragmentary vertical section through the base and the lower part of the making pot;

Fig. 4 is a bottom view of that portion of the base shown in Fig. 3 with the bottom cover plate removed, and Fig. 5 is a wiring diagram.

This is a division of our application, Serial No. 129,163, filed March 5, 1937, entitled "Coffee maker."

The embodiment of the invention herein shown includes a base designated generally by the numeral 6 having a plurality of legs 7, a making pot designated generally by the numeral 8, and a serving pot 9, the making pot 8 being fixedly attached to the base, and the serving pot 9 being capable of ready removal from the base for the purpose of serving the coffee liquor contained therein. The base 6 is formed, in this instance, from sheet metal to provide an ornamental supporting annular side wall 11 to which the legs 7 are attached and a top surface member 12 forming a heat conducting member. The heat conducting member has a pair of laterally spaced top recesses 13 and 14, the recess 14 being of somewhat greater depth than the recess 13. Cylindrical side walls 15 of the making pot 8 are seated in the recess 14 (Fig. 3), the lower edges of the walls abutting against the heat conducting member 12. A recessed bottom member 16 is seated between the walls 15 and forms the bottom for the pot 8. This bottom member likewise provides a recess for the reception of a heating element 17 held in position by means of a pressure plate 18 which is interposed between the heating element and the heat conducting member 12 at the bottom of the recess 14. The heating element 17 serves to heat the contents of the making pot 8 and simultaneously to heat the heat conducting member 12 for a purpose which will presently appear.

A handle 19 preferably of insulation material such as synthetic resin, is affixed to the side of the making pot 8 adjacent the top thereof and above the end of the base 6, as best shown in Figs. 1 and 2. The upper ends of the side walls 15 are rolled inwardly as shown at 21 for the purpose of providing a seat at the upper open end of the pot 8. Positioned within the pot 8 is a coffee liquor cup 22 of such size as to be completely received in the upper part of the pot 8, the cup 22 being flared outwardly adjacent its upper edge, as shown at 23, for the purpose of forming a ring-like chamber 24, as will presently appear. The upper edge of the liquor cup 22 is flanged, as shown at 25, and has seated thereon a rubber or other resilient gasket 26, the flange 25 and gasket 26 having shape characteristics for seating against the open upper end of the pot 8, as best shown in Figure 1. Axially disposed with respect to the cup 22 is a delivery tube 27 which passes through the bottom of the cup 22 and extends from a point closely adjacent the bottom member 16 of the pot to an elevated point in the cup 22, as shown at 28. It will be noted that when the gasket 26 is firmly seated on the upper end of the pot, the tube 27 comprises the only means of communication between the lower side of the cup 22 and the upper side of the cup 22, the cup thus forming a water chamber designated generally by the numeral 29.

A sheet metal cover designated generally by the numeral 31 has an annular shoulder 32 adapted when the cover is positioned on the top of the pot to abut against the upper side of the gasket 26 and an annular flange 33 extending downward along the outer edge of the gasket to cover and conceal the same. Thus, the gasket 26 serves to provide a water and steam tight joint between the upper end of the pot 8, the cup 22 and the cover when the cover is pressed downward by means presently to be described. The cover has an annular rib 34 arranged to cooperate with the flange 23 of the cup 22 in forming the chamber 24, and a rib 36 adapted to receive and support a gasket 37 of rubber or other suitable resilient material. A thimble 38 is axially positioned in the top and has a threaded bore 39 for the reception of a screw 41 carrying a knob 42. A conical pressure portion 44 encircles the screw 41 and is adapted to engage against a conical seat 45 on a strap 46 when the screw is threaded out of the bore 39. The strap 46 is arcuate in shape and has its ends journaled in the wall 15 of the pot 8 for rotation on a transverse axis from a position to one side of the pot to the position shown in Figs. 1 and 2. The strap has a slot 47 for reception of the screw 41 when the strap occupies the position shown in Figure 1. It will be seen that by rotating the knob 42 the screw 41 may be threaded out of the thimble, thus applying pressure between the shoulder 25 of the top, the gasket 26, and the top edge of the pot 8 so as to seal the junction between these elements. The complementary conical portions 44 and 45 serve to center the strap 46 on the screw 41 and to prevent the strap from creeping under rotative movement of the screw.

The lower end of the thimble 38 has a threaded portion 48 of reduced cross-section providing a shoulder 49, these elements acting to support a coffee container or cup 51 on the top. The cup 51 has cylindrical side walls 52 and a perforated flat bottom 53, the upper edges of the side walls being rolled as shown at 54 for abutment against the gasket 37. A sleeve 55 extends upward axially in the cup and at its upper end has an internally threaded portion 56 arranged to cooperate with the threaded portion 48 to draw the upper edges of the cup firmly against the gasket and thus produce a water-tight joint. Other devices may be employed to produce a seal between the coffee container and the cup 22 with satisfactory results. The sleeve 55 is of such internal diameter as to closely receive the upper end of the delivery tube 27, and is provided with a plurality of small openings 58 above the upper end of the tube 27, the openings being uniformly distributed annularly of the sleeve such that water passing upward through the tube 27 will be uniformly discharged from the sleeve in all directions.

The operation of the coffee making pot is substantially as follows: The cover 31 and attached cup 51 are removed from the top of the pot releasing the cup 22, gasket 26 and tube 27, which are then removed from the pot. The required amount of water is then placed within the water chamber 29 through the open end of the pot. The cup 22 with its attached tube 27 and gasket 26 are then dropped into the end of the pot. The coffee cup 51 is unscrewed from the cover and the required amount of coffee is inserted into the cup. A filter paper 59 may be inserted across the perforated bottom 53 if desired. The coffee cup 51 is then again attached to the cover with the upper edge 54 thereof firmly abutting the gasket 37, whereupon the cover and attached cup are lowered into the liquor cup 22 with the sleeve 55 passing over the upper end of the tube 27. A lug 61 is positioned on the outer side of the wall 15 and cooperates with the flange 33 of the cover to locate the cover on the pot. Current is then supplied to the heating element 17 and when sufficient steam pressure is generated within the water chamber 29, the water will be forced up the tube 27 and out through the openings 58 onto the coffee into the cup 51, filling this cup and forcing the hot water through the bed of coffee and out through the perforations in the bottom 53. The coffee liquor resulting from this extraction operation passes upwardly between the outer wall of the cup 51 and the inner wall of the cup 22 into the annular chamber 24 and thence to an opening 62 in the cover, discharging into a spout 63 attached to the cover from which the coffee liquor is discharged into a pouring spout 64 of the serving pot 9. When all of the water has thus been displaced from the chamber 29, steam under some pressure will follow upward through the tube 27 causing the remainder of the liquid to be displaced from the cup 51 and from the chamber 24 surrounding the cup 51 leaving these elements at the close of the coffee making operation substantially free of liquid.

The serving pot 9 is substantially identical in outer appearance with the making pot 8, with the exception of the spouts 63 and 64. The serving pot has cylindrical side walls 65, a bottom 66, and a handle 67, the handle being the counterpart of the handle 19 and likewise located. The pot has a cover 68 substantially similar in shape to the cover 31, a strap 69 pivotally supported on the side walls of the pot as shown at 71 and similar to the strap 46, a knob 72 similar to the knob 42, and a screw 73 shaped, located, and operated in the same manner as the screw 41. Positioned on the side wall of the pot opposite the handle 67 is the spout 64 which extends substantially from top to bottom of the pot as shown in Figure 1. This spout provides a channel for the reception of the coffee liquor from the making pot, the liquor being discharged slightly below the flared outer end 74 of the pouring spout. The side wall 65 of the serving pot is provided with a relatively large opening 75 at the lower end of the spout 65 and with a relatively large opening 76 adjacent the top of the spout. A plurality of smaller openings 77 are located below the opening 76 but adjacent the upper end of the spout 64. Through the provision of the openings 75, 76 and 77 spaced in the manner shown in Figure 1, the coffee entering the serving pot is given a considerable degree of turbulence since a part of the liquor will enter through the opening 76, an additional part through the openings 77, and the remainder through the opening 75. Through this arrangement uniformity of the coffee liquor in the serving pot is obtained as a result of its discharge into the pot. This arrangement prevents stratification of the coffee liquor in the serving pot. It will be understood that otherwise the coffee liquor discharged from the discharge spout 63 may be of different character during the early part of the coffee maker operation from that discharged during the latter part. In fact, in some instances the discharge from the spout 63 may run practically clear at the end of the coffee making operation.

It will be seen that the serving pot 9 is arranged for convenient removal and replacement on the base 6, and that the base 6 and serving pot are arranged for convenient replacement of the pot in the proper location and space arrangement with respect to the making pot 8. Thus the serving pot seats in the recess 13 of the heat conducting member 12 which acts to locate the lateral position of the pot. At the same time the discharge spout 63 is received in the pouring spout 64 in such manner that the serving pot may be raised vertically to a limited extent sufficient to permit the pot to be tilted so that the bottom thereof may be removed from the recess 13 and the pot transported as desired in the dispensing of the coffee. The relationship between the spouts 63 and 64 is, however, such that the entire coffee maker may be handled by grasping the handle 67 since vertical movement of the pot 9 is permitted to only a limited extent. Because of this limit in the relative vertical movement of the pots, the coffee maker may be handled as a unit by simultaneous manipulation of the handles 19 and 67.

It will be seen that because of the location of the serving pot 9 upon the heat conducting plate 12, the heating element 17 is not only effective to heat the contents of the making pot, but is also effective to heat the coffee stored in the serving pot. To accomplish this and other results, we have provided novel control means for the heating element which is effective to control the coffee making operations and the heating of the stored coffee. To this end we provide a pressure responsive element 78 positioned in the bottom 16 of the making pot adapted to actuate a pin 79 carried in a sleeve 81 passing through the bottom 16, the heating element 17, the plate 18, and the heat conducting member 12, and thus extending into the hollow base 6 (Fig. 3). The pressure responsive element 78 is arranged to move the pin 79 downwardly facing Fig. 3 upon increasing temperature against the tension of spring 87, the spring acting to retain the pin upon decrease of pressure. A plate 82 is attached to the heat conducting member 12 by means of bolts 83, and is arranged to carry switch mechanism for opening and closing the circuit to the heating element 17. Positioned on the plate 82 and insulated therefrom are bus-bars 84 and 85 (Fig. 4) carrying terminal posts 86 of conventional form for attachment to a source of current supply. Electrically connected to the bus-bar 84 is a spring pressed contact lever 87 having contacts 88 and 89. Opposed to the contact 88 is a stationary contact 91 electrically connected to one terminal of the heating element by a connector member 92. The opposite terminal of the heating element is connected to the bus-bar 85 through a connector 93 and consequently, when the contacts 88 and 91 are made, current will flow through the heating element 17 and when opened, current will cease to flow. The lever 87 is tensioned in such a manner as to close these contacts if unrestrained. A switch-actuating lever 94 is journaled on ears 95 as shown at 96 and carries at its free end a button 97 of insulation material such as porcelain. Intermediate the ends of the lever 94 and in cooperative relationship with the pin 79 is an adjusting screw and nut 98 which may be set to predetermine the relationship between the position of the pin 79 and the button 97 so that at a predetermined pressure within the making pot, the button will be forced against the contact lever 87 opening the contacts 88 and 91 and terminating the flow of current through the heating element, thereby rendering the heating of the making pot responsive to the pressure within the pot. Opposed to the contact 89 is a contact 99 carried on a spring-pressed blade 101 supported on a connector 102 attached to the plate 82 and insulated therefrom. The contact 99 is electrically connected to a lamp bulb 103, the circuit through which is completed through the connector 93 and bus-bar 85. A lens or window 104 is positioned in the heat conducting plate 12 between the two pots so as to render the light from the lamp 103 visible from the exterior of the base. A bi-metal blade 105 is attached to the heat conducting member 12, passing through the plate 18 and heating element 17 as shown in Fig. 3 in such manner that the surface of the blade contacts the lower surface of the heat conducting member when the element is cold. The free end of the bimetal element has a button 106 of suitable insulation, an example of which may be porcelain, adapted upon increase in temperature of the member 12 and heating element to come into contact with the contact blade 101 and force this against its normal spring pressure so as to close the contacts 89 and 99, whereupon current will flow through the lamp, as will be obvious from Fig. 5. Upon a small further increase in the temperature of the bimetal element and consequent additional movement thereof the contact 88 will be moved against the tension of its spring support so as to open the contacts 88 and 89, thereby cutting off the heating element. Likewise, when the bimetal element cools slightly the contacts 88 and 89 will again be made and the heating element energized, this cycle being repeated to maintain substantially uniform temperature. During this cycle the contacts 89 and 99 will remain continuously closed.

The control mechanism is so set that the opening and closing of the contacts 88 and 91 is entirely under the control of the pressure responsive means while there is water in the making pot. In one suitable example the pressure mechanism is arranged so that the contact points will be opened when the pressure in the making pot is in the region of four to five pounds, and the bimetal element is set to open the contact points when the bimetal blade reaches a temperature in the neighborhood of 225° F. Through this arrangement we are enabled to maintain a predetermined low temperature during the coffee making operations and a predetermined higher temperature upon the completion of the coffee making operations for the purpose of conducting heat to the serving pot through the heat conducting plate 12. It will be seen that the pressure element 78 will be effective to open and close the switch formed by the contacts 88 and 91 so long as water remains in the making pot. However, as pressure is developed on the water in the water chamber 29, the water is displaced upward through the delivery tube 27 and out of the pot, as heretofore described, the rate of delivery of the water through the tube 27 and the rate of its passage through the bed of ground coffee will be held substantially constant in response to the constant pressure maintained in the water chamber as a result of the opening and closing of the circuit by the pressure responsive means. When all of the water has been displaced, the excess steam will likewise pass out through the tube 27, whereupon the pressure on the pressure responsive element 78 will drop substantially to atmospheric, permitting the closing of the switch. Thereupon the heating element is energized and the temperature surrounding the heating element will increase until the switch is opened by operation of the bimetal element 105. This element will then function in the manner described to maintain a substantially uniform temperature of the heat conducting member 12 and maintain the coffee stored in the serving pot at a substantially uniform temperature.

It will be seen that because of the nature of the control mechanism, we are enabled to employ a heating element of high wattage capable of bringing the water in the making pot to a boiling temperature in very short time, thus reducing to a minimum the time required for the making of coffee, since the pressure responsive mechanism functions to control the heating element at the moment the required temperature is reached to produce the nicety of operation required in the production of good coffee. In other words, during the period in which the water is being brought up to a suitable temperature for the making of coffee, we are enabled to have an abundance of heat which is promptly reduced to a relatively small amount when the water reaches the required temperature. Likewise, when the making of the coffee has been completed, the control means automatically and in response to the completion of the coffee making operations produces additional heat for the purpose of heating the serving pot. During the actual extraction operation the pressure control mechanism acts to maintain a substantially uniform pressure and therefore a substantially uniform rate of flow through the coffee, as distinguished from an increasing rate of flow such as would otherwise occur as a result of which the desired material is extracted from the coffee and the undesirable portion allowed to remain.

Attention is directed to the construction of the extraction portion of the coffee making pot in that the coffee or the coffee liquor never comes into contact with the pot proper so that this portion of the device never needs to be washed. In cleaning the device it is only necessary to remove the cups 22 and 51 and the cover 31 which may be conveniently washed and replaced. This is further facilitated by the fact that the steam which comes through these parts of the device at the end of the coffee making operation forces substantially all of the water and coffee liquor out of the cups so that these elements are substantially free from liquid upon the termination of the coffee making operations. This facilitates the removal of the coffee grounds from the cup 51, and also prevents after dripping from the spout 63. In other words, at the conclusion of the coffee making operation there is no remaining liquid within the pot to drip from the spout 63 when the serving pot is removed from beneath this spout.

Another feature of the invention lies in the construction of the pouring spout 64 wherein the vertically spaced openings 75—77 are provided which brings about uniformity in the coffee in the serving pot. Likewise, this spout cooperates with the spout 63 and the handles 19 and 67 in transporting the coffee maker as a unit.

It will be understood that the foregoing description and accompanying drawings are by way of illustration, and we do not wish to be limited except as required by the prior art and the scope of the appended claims.

We claim:

1. The combination in a coffee maker of a base, a serving pot removably seated on the base and having a top opening and a handle for lifting the pot in serving the contents, a making pot fixed to said base comprising a water chamber, a coffee container, and means for transmitting water from the water chamber to the coffee container, the serving pot having a pouring spout extending substantially from the bottom to the top and having an opening into the spout near the bottom and another near the top, and a laterally disposed discharge tube at the top of said making pot communicating with said coffee container to discharge coffee into the top of the pouring spout.

2. The combination in a coffee maker of a heat conducting base, a making pot fixed to the base, said making pot having a handle and a coffee extraction means adjacent the top thereof, a serving pot having a handle, interlocking means for removably seating the serving pot on the base, the serving pot having a pouring spout extending substantially from the bottom to the top and having an opening into the spout near the bottom and another near the top, means for delivering liquid from the top of the making pot into the top of the pouring spout serving pot, and means for heating the base at the making pot to heat both of said pots.

3. The combination in a coffee maker of a heat conducting base, a making pot fixed to the base, said making pot having a laterally disposed handle on one side and a coffee extraction means therein adjacent the top thereof, a serving pot positioned beside the making pot having a laterally disposed handle on the side opposed to said making pot to function with the making pot handle in manipulation of the coffee maker and having a spout opening at the top thereof, interlocking means for removably seating the serving pot on the base, the serving pot having a pouring spout extending substantially from the bottom to the top and having an opening into the spout near the bottom and another near the top, means for delivering coffee liquid from the top of the making pot into the top of said spout, and means for heating said base at the making pot to heat both of said pots.

4. The combination in a coffee maker of a base a making pot fixed thereon having at its top a laterally disposed discharge spout for the discharge of coffee and an oppositely disposed handle, and a serving pot on said base laterally spaced from the making pot having a laterally disposed pouring spout for the reception of coffee from said discharge spout and an oppositely disposed handle for lifting the pot from the base in serving the contents, said spouts interfitting to limit relative vertical movement of said pots for simultaneous use of said handles in manipulation of the coffee maker as a unit the serving pot having a pouring spout extending substantially from the bottom to the top and having an opening into the spout near the bottom and another near the top.

5. A coffee maker comprising in combination a making pot having a water heating chamber, a liquor discharging chamber thereabove having a point of discharge adjacent to its top, a coffee chamber having a perforate bottom, a tube extending from a point adjacent the bottom of the water chamber to a point in the liquor chamber adjacent to its top, said coffee chamber being positioned in said liquor chamber in communication with the upper end of said tube whereby water displaced upwardly through said tube is received in said coffee container at the top thereof, means confining the flow from said container to said perforate bottom to cause the liquor to pass downwardly through a bed of coffee contained thereon and thence upwardly through said liquor container to the point of discharge, said tube and coffee chamber being the sole means of communication between said water chamber and said liquor chamber, said tube being the sole exit from the water chamber, said perforations being the sole exit from the coffee chamber, and said spout being the sole exit from the liquor chamber.

6. A coffee maker comprising in combination a making pot having a water heating chamber, a liquor cup seated on said pot nesting in the top thereof and having a centrally disposed tube extending from an elevated point in the cup to a point adjacent the bottom of the water chamber, a cover for said pot having a discharge spout for the passage of liquor from the pot, a coffee container having a perforate bottom adapted to telescope into said liquor cup and to receive the elevated end of said tube for the reception of water displaced upwardly through said tube, said tube being the sole exit from the water chamber, the perforations being the sole exit from the coffee container and the spout being the sole exit from the liquor cup, and means for heating water in the water chamber to displace the same upwardly through said tube.

7. A coffee maker comprising in combination, a pot, a cover having a delivery spout, and concentric cups in the upper end of said pot to provide a lower water chamber, an upper coffee chamber and an intermediate liquor chamber, means for supporting the outer cup at its periphery between the cover and pot, means for supporting the inner cup with its top in water-tight relationship with the cover, said inner cup having a perforate bottom for the support of coffee under extraction, a tube axially carried on the outer cup and extending from a point adjacent the bottom of the pot to an elevated point within the cup, said tube constituting the sole means of communication between the lower and upper side of the cup, whereby said inner cup is positioned for the reception of water displaced from adjacent the bottom of the pot, and means for fastening the cover to the pot to provide a steam tight joint between the cover, outer cup and pot.

8. A coffee maker comprising in combination a pot having an open upper end, a liquor cup having an annular flange at its upper edge adapted to seat across the upper end of the pot, a cover for said pot arranged to seat on said flange to provide a chamber below and above said cup, and a perforate coffee container removably attached to said cover adapted to receive water from below said cup, the container having a top edge arranged to seat on the cover with a water tight connection to confine the flow therethrough to the perforations.

9. In a coffee maker of the type having a making pot and a spout thereon for discharging the coffee liquor, the combination therewith of a serving pot having a pouring spout positioned for the reception of the liquor from said discharge spout and extending longitudinally of the serving pot throughout a greater portion of its length, the serving pot having openings into said spout at each end of the latter.

10. In a coffee maker of the type having a making pot and a laterally projecting discharge spout thereon for discharging coffee liquor, the combination therewith of a serving pot having substantially cylindrical side walls, a tube-like channel member extending longitudinally of the serving pot from bottom to top attached to the walls throughout its length to form a pouring spout, said serving pot having openings in its wall at the bottom and the top of the pot and spout, said discharge spout being positioned to discharge into the top of said pouring spout, whereby coffee liquor discharged into the serving pot spout will enter the serving pot from the bottom and whereby the coffee liquor will pass from the serving pot into its spout through both the top and bottom openings when pouring.

11. A coffee maker comprising in combination a making pot having a water heating chamber, a liquor cup nesting in the top of said pot and having a tube extending from an elevated point in the cup to a point adjacent the bottom of the water chamber, a cover for said pot having a discharge spout for the discharge of coffee liquor from the pot, a coffee container having a perforate bottom portion nesting in the liquor cup and having a substantially water tight connection at its top with the cover, the upper end of said tube adapted to discharge heated water into the upper portion of the coffee container, the tube being the sole exit from the water chamber, the perforations being the sole exit from the coffee container and the spout being the sole exit from the liquor cup, means for heating water in the water chamber to displace the same upwardly through said tube, and a serving pot mounted in juxtaposition to the making pot and arranged for receiving the coffee liquor from said discharge spout.

12. A coffee maker as set forth in claim 11, in which the liquor cup has an annular gasket at its upper end which provides a seal between the cup and the top of the making pot and a second seal between the cup and the cover.

13. A coffee maker as set forth in claim 11, in which the serving pot has a pouring spout extending substantially from the bottom to the top and has an opening into the spout near the bottom and another near the top, whereby liquor discharged into said spout will enter the serving pot from the bottom and whereby the liquor will pass from the serving pot into the spout through both the tube and bottom openings when pouring.

14. A coffee maker as set forth in claim 11, including a base to which the making pot is fixed and upon which the serving pot is removably mounted, and means in the base for directly heating the making pot and adapted to heat the serving pot by conduction through the base, the making pot and the serving pot each being of substantially the same height and diameter.

15. A coffee maker comprising, in combination, a making pot having a water heating chamber, a liquor cup nesting in the top of said pot, a coffee container cup nesting in the top of the liquor cup and having a perforate bottom, a cover for the pot having a discharge spout, and a vertical tube extending from a relatively low point in the heating chamber to a relatively high point in the coffee container cup, the tube being the sole exit from the water chamber, the perforated bottom being the sole exit from the coffee container cup, and the discharge spout being the sole exit from the liquor cup.

16. A coffee maker as set forth in claim 15, in which the liquor cup has an annular gasket which seals the upper end of the heating chamber and also provides a seal between said liquor cup and the cover.

17. A coffee container as set forth in claim 15, in which the cover is provided with means for closing communication between the interior of the coffee container cup and the liquor cup at the upper end of said coffee container cup.

18. A coffee maker comprising, in combination, a making pot having a water heating chamber, a liquor cup nesting in the top of said pot and having a vertical tube fixed to its bottom wall, the tube extending from a relatively lower point in the heating chamber to a relatively high point in the liquor cup, the liquor cup sealing the top of said chamber, a coffee container nesting in the top of the liquor cup having a perforate bottom and a tube telescoping over the upper portion of the first mentioned tube and extending to a relatively high point in the container above the ground coffee, a cover sealing the top of the liquor pot and having a discharge spout, and means providing a seal between the cover and the interior of the coffee container at the upper end thereof, the first mentioned tube serving to discharge heated water into the upper portion of the coffee container and being the sole exit from the water chamber, the perforations being the sole exit from the coffee container, and the spout being the sole exit from the liquor cup.

19. A coffee maker comprising, in combination, a making pot having a discharge spout at its upper end, a serving pot having a pouring spout extending substantially from the bottom to the top thereof, the serving pot having an opening into the pouring spout near the bottom thereof and another opening thereinto near the top thereof, the pouring spout being arranged to receive the coffee discharged from the spout on the making pot.

IVAR JEPSON.
GEORGE BROWNING.